June 24, 1930.  S. WEROTTE  1,767,907
METHOD AND APPARATUS FOR CONVEYING STRIPS, SHEETS, OR PLATES OF GLASS
Filed Jan. 16, 1928
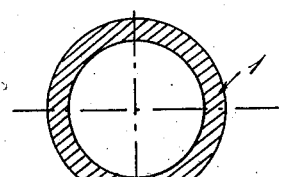
Fig 1
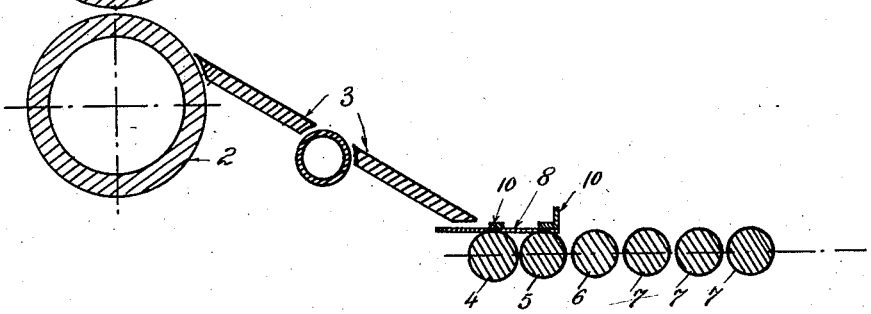
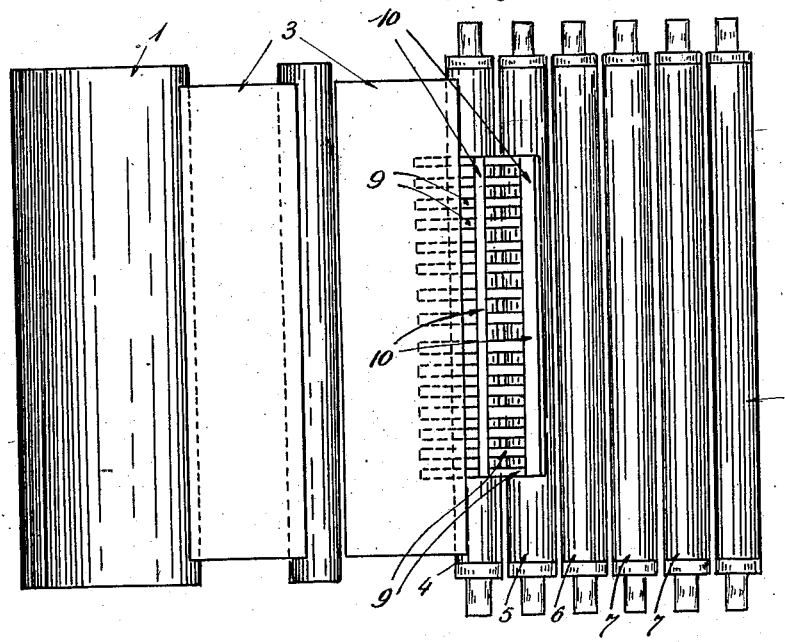
Fig 2
Fig. 3
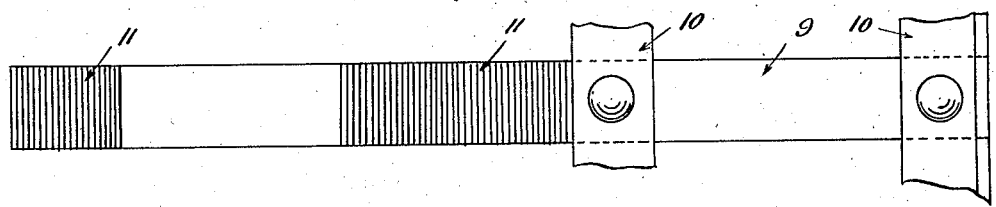
Fig 4
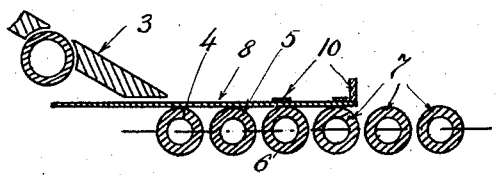
S. Werotte
INVENTOR Patented June 24, 1930

1,767,907

UNITED STATES PATENT OFFICE

SÉRAPHIN WEROTTE, OF AUVELAIS, BELGIUM, ASSIGNOR, BY MESNE ASSIGNMENTS, TO THE AMERICAN BICHEROUX COMPANY, A CORPORATION OF DELAWARE

METHOD AND APPARATUS FOR CONVEYING STRIPS, SHEETS, OR PLATES OF GLASS

Application filed January 16, 1928. Serial No. 247,239.

The present invention relates to the manufacture of glass in the form of strips, sheets, or of plate glass, and concerns specially the conveying of such strips, sheets or plates at the exit from the glass-making apparatus.

The glass is generally conveyed at this point by a system of mechanically driven rollers which are preferably made all with the same diameter and driven at the same speed, in order to simplify their construction and drive.

Since the diameter of the conveying rollers is rather large, a comparatively large clear space is left between the lines of contact of the different rollers with the conveyed strip, sheet or plate, which space must be crossed by the front edge of the glass self-supported by its own strength.

This supporting action is automatically obtained on account of the stiffness of the material as soon as the glass has completely solidified, but it is not at all so at the exit from the glass-making apparatus where the glass is still only somewhat plastic.

At this point, the front edge of the strip, sheet or plate produced has a tendency to deflect, at least in the space between the first two conveying rollers, and though the glass may engage on the second roller, it is often only with difficulty and after striking against the said roller.

Striking against the roller causes a blow and said blow upsets the edge of the glass, interfering with the start of the conveying operation.

When the glass is being made in a continuous strip or sheet, the above inconvenience may be of minor importance, but in the discontinuous processes, in which each sheet or plate is formed by pouring the contents of a pot of molten glass, the difficulties of starting the conveying operation are repeated for each successive sheet or plate.

The invention has for object to overcome this disadvantage.

It consists mainly in substituting a positive or automatic start for the natural start of the conveying operation, at the exit from the glass-making apparatus, by receiving the leading end of the sheet on a rigid member, supported by the first few or at least the first two conveyor rollers, so that correct engagement on the latter will always be insured whatever may be the consistency of the leading edge of the strip, sheet or plate at the exit from the glass-making apparatus.

The invention also consists in preferably using a metallic "bait" for the member receiving the leading end of the strip, sheet or plate, the said "bait" being designed so as to obtain a strong adherence of the end of the strip, sheet or plate in order to prevent any possible separation.

The invention further consists in constructing the system of conveying rollers so that the "bait" can be kept stationary when waiting to receive the end of the strip, sheet or plate, and be moved in translation as soon as the said end is received.

In order that the invention may be clearly understood, it will now be described as applied to conveying strips, sheets or plates made by rolling, reference being made to a certain form of construction shown as an example in the accompanying drawing, in which:

Fig. 1 is a side elevation showing diagrammatically a set of rolling cylinders, a set of conveying rollers and a "bait", in the waiting position to receive the strip, sheet or plate.

Fig. 2 is a plan of the arrangement shown in Fig. 1.

Fig. 3 is an enlarged detail section of a "bait".

Fig. 4 is a view similar to Fig. 1 of an alternative.

As stated and as illustrated, assuming that 1 and 2 designate two rolling cylinders adapted to form a strip, sheet or plate of glass, that 3 designates a receiving table, conducting the strip, sheet or plate to the conveying rollers 4, 5, 6, 7, when the leading edge of the strip, sheet or plate reaches the space between the rollers 4 and 5, it will have a tendency to bend on account of its lack of consistency and of the tendency of the glass to adhere to the cold roller 4. As a result, the leading edge will not engage, or engage only with difficulty, on the roller 5 and the subsequent rollers.

In order to positively insure such engagement, there is provided a transporting "bait" 8 designed for receiving the leading end of the strip, sheet or plate and previously located so as to bear on at least the first two rollers 4 and 5.

Conveniently, the drive for a number of rollers, including the first two rollers on which the "bait" rests comprises a clutch member enabling said rollers to be held stationary while waiting to receive the strip, sheet or plate.

As soon as the said strip, sheet or plate is received, the clutch is operated so as to drive the said rollers.

The "bait" 8 may have numerous different forms, but is conveniently made as illustrated in Figs. 2 and 3, i. e., be provided with a set of parallel spaced straps 9 connected together at their front part by two or more cross pieces 10, the end cross piece being an angle bar.

The "bait" 8 could be extended lengthwise as far as desired under the inclined table following the rolling cylinders to insure great security in the engagement. The rollers supporting the "bait" will in such case be more than two (Fig. 4).

For the purpose of increasing the adherence between the leading edge of the glass and the "bait", so as to avoid any possible separation, the straps 9 are preferably transversely grooved or serrated on a part of their length, as shown at 11 in Fig. 3.

Claims:

1. A method of conveying strips, sheets or plates of glass on a set of conveying rollers, which consists in supporting the leading end of the strips, sheets or plates in spaced relation to the rollers while it is moved on the latter.

2. A method of conveying sheets or plates of glass on a set of conveying rollers at the exit from a glass rolling apparatus which consists in receiving the leading end of the strip, sheet or plate on a rigid member supported on the rollers and moving together the member and the strip, sheet or plate.

3. A method of conveying strips, sheets or plates of glass on a set of conveying rollers at the exit from a glass rolling apparatus which consists in receiving the leading end of the strip, sheet or plate on a waiting member supported on the rollers and moving together the member and the strip, sheet or plate.

4. A method of conveying strips, sheets or plates of glass on a set of conveying rollers at the exit from a glass rolling apparatus which consists in receiving the leading end of the strip, sheet or plate on a member supported on stationary rollers of the set and moving said rollers, the member and the strip, sheet or plate.

5. In combination with a glass rolling apparatus comprising sheet rolling cylinders and a set of conveying rollers, of a rigid member supported on the conveying rollers and adapted to receive the leading edge of the strip, sheet or plate formed between the rolling cylinders and to be moved together with the strip, sheet or plate.

6. In combination with a glass rolling apparatus comprising sheet rolling cylinders and a set of conveying rollers, of a rigid member supported on the conveying rollers in a waiting position of the leading edge of the strip, sheet or plate at the exit from the rolling apparatus and means to move together the rigid member and the strip, sheet or plate.

7. In combination with a glass rolling apparatus comprising sheet rolling cylinders and a set of conveying rollers, of a rigid member adapted to be supported in a waiting position on the conveying rollers to receive the leading edge of the strip, sheet or plate at the exit from the rolling apparatus and to be conveyed together with said strip, sheet or plate.

8. In combination with a glass rolling apparatus comprising sheet rolling cylinders and a set of conveying rollers, of a rigid member supported in a waiting position on stationary rollers of the set located adjacent the rolling cylinders and adapted to receive the leading edge of the strip, sheet or plate formed between the rolling cylinders.

9. A rigid member adapted to receive the leading edge of a strip, sheet or plate formed between rolling cylinders of a glass rolling apparatus and formed with a set of spaced parallel elements connected together at the front part thereof by one or more cross pieces.

10. A receiving member adapted to receive the leading edge of a strip, sheet or plate formed between rolling cylinders of a glass rolling apparatus and to support said leading edge during the travel of the sheet on a set of conveying rollers, such member formed with a set of spaced parallel elements connected together at the front part thereof by one or more cross pieces and parts of the said elements grooved or serrated transversally in order to insure a strong adherence of the glass on the receiving member.

11. A glass rolling apparatus comprising in combination a pair of rolling cylinders and a set of conveying rollers, means to conduct the rolled strip, sheet or plate from the rolling cylinders to the conveying rollers and a receiving member supported on said conveying rollers and adapted to receive the leading edge of the rolled strip, sheet or plate and support said leading edge during the travel of the strip, sheet or plate on the said conveying rollers.

In testimony whereof I affix my signature.

SÉRAPHIN WEROTTE.